United States Patent [19]

Kerr et al.

[11] Patent Number: 6,045,952
[45] Date of Patent: Apr. 4, 2000

[54] ELECTROCHEMICAL STORAGE CELL CONTAINING A SUBSTITUTED ANISOLE OR DI-ANISOLE REDOX SHUTTLE ADDITIVE FOR OVERCHARGE PROTECTION AND SUITABLE FOR USE IN LIQUID ORGANIC AND SOLID POLYMER ELECTROLYTES

[75] Inventors: John B. Kerr, Oakland, Calif.; Minmin Tian, Kobe, Japan

[73] Assignee: The United States of America as represented by the United States Department of Energy, Washington, D.C.

[21] Appl. No.: 09/045,814

[22] Filed: Mar. 23, 1998

[51] Int. Cl.[7] .................................................. H01M 10/40
[52] U.S. Cl. .......................................... 429/307; 429/324
[58] Field of Search .................................... 429/307, 324, 429/326

[56] References Cited

U.S. PATENT DOCUMENTS 4,046,652  9/1977  Pistorius et al. ........................ 204/78

(List continued on next page.)

OTHER PUBLICATIONS

Azzena, Ugo, et al., "Electron–Transfer–Induced Reductive Demethoxylation of Anisole: Evidence for Cleavage of a Radical Anion", *J. Org. Chem.*, vol. 57, No. 5, 1992, pp. 1444–1448. (Month Unknown).

(List continued on next page.)

*Primary Examiner*—Stephen Kalafut
*Attorney, Agent, or Firm*—William C. Daubenspeck; William R. Moser; Paul A. Gottlieb

[57] ABSTRACT

A electrochemical cell is described comprising an anode, a cathode, a solid polymer electrolyte, and a redox shuttle additive to protect the cell against overcharging and a redox shuttle additive to protect the cell against overcharging selected from the group consisting of:

(a) a substituted anisole having the general formula (in an uncharged state):

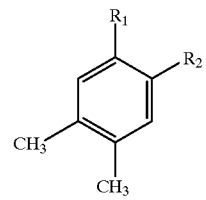

where $R_1$ is selected from the group consisting of H, $OCH_3$, $OCH_2CH_3$, and $OCH_2phenyl$, and $R_2$ is selected from the group consisting of $OCH_3$, $OCH_2CH_3$, $OCH_2phenyl$, and $O^-Li^+$; and (b) a di-anisole compound having the general formula (in an uncharged state):

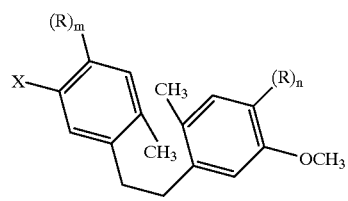

where R is selected from the group consisting of $-OCH_3$ and $-CH_3$, m is either 1 or 0, n is either 1 or 0, and X is selected from the group consisting of $-OCH_3$ (methoxy) or its lithium salt $-O^-Li^+$. The lithium salt of the di-anisole is the preferred form of the redox shuttle additive because the shuttle anion will then initially have a single negative charge, it loses two electrons when it is oxidized at the cathode, and then moves toward the anode as a single positively charged species where it is then reduced to a single negatively charged species by gaining back two electrons.

24 Claims, 1 Drawing Sheet

U.S. PATENT DOCUMENTS

| | | |
|---|---|---|
| 4,082,809 | 4/1978 | Pistorius et al. . |
| 4,670,363 | 6/1987 | Whitney et al. . |
| 5,470,674 | 11/1995 | Doddapaneni et al. ............ 429/307 X |
| 5,709,968 | 1/1998 | Shimizu . |

OTHER PUBLICATIONS

Jonsson, M., et al., "Redox Chemistry of Substituted Benzenes. The One–Electron Reduction Potentials of Methoxy–Substituted Benzene Radical Cations", *J. Phys. Chem.*, vol. 97, No. 43, 1993, pp. 11278–11282. (Month Unknown).

Kerr, John B., Mechanistic Study of Anodic Intramolecular Coupling Reactions, *Journal of the American Chemical Society*, vol. 101, No. 24, Nov. 21, 1979, pp. 7338–7346. (Month Unknown).

Maercker, Adalbert, "Ether Cleavage with Organo–Alkali–Metal Compounds and Alkali Metals", *Angew. Chem. Int. Ed. Engl.*, vol. 26, 1987, pp. 972–989. (Month Unknown).

Márquez, Jairo, et al., "Reactivity of Methyl Substituted Anisole by Electrochemistry", Revue Roumaine de Chimie, vol. 38, No. 7, 1993, pp. 775–781. (Month Unknown).

Richardson, Thomas J., et al., "Overcharge Protection for Rechargeable Lithium Polymer Electrolyte Batteries", *J. Electrochem. Soc.*, vol. 143, No. 12, Dec. 1996, pp. 3992–3996.

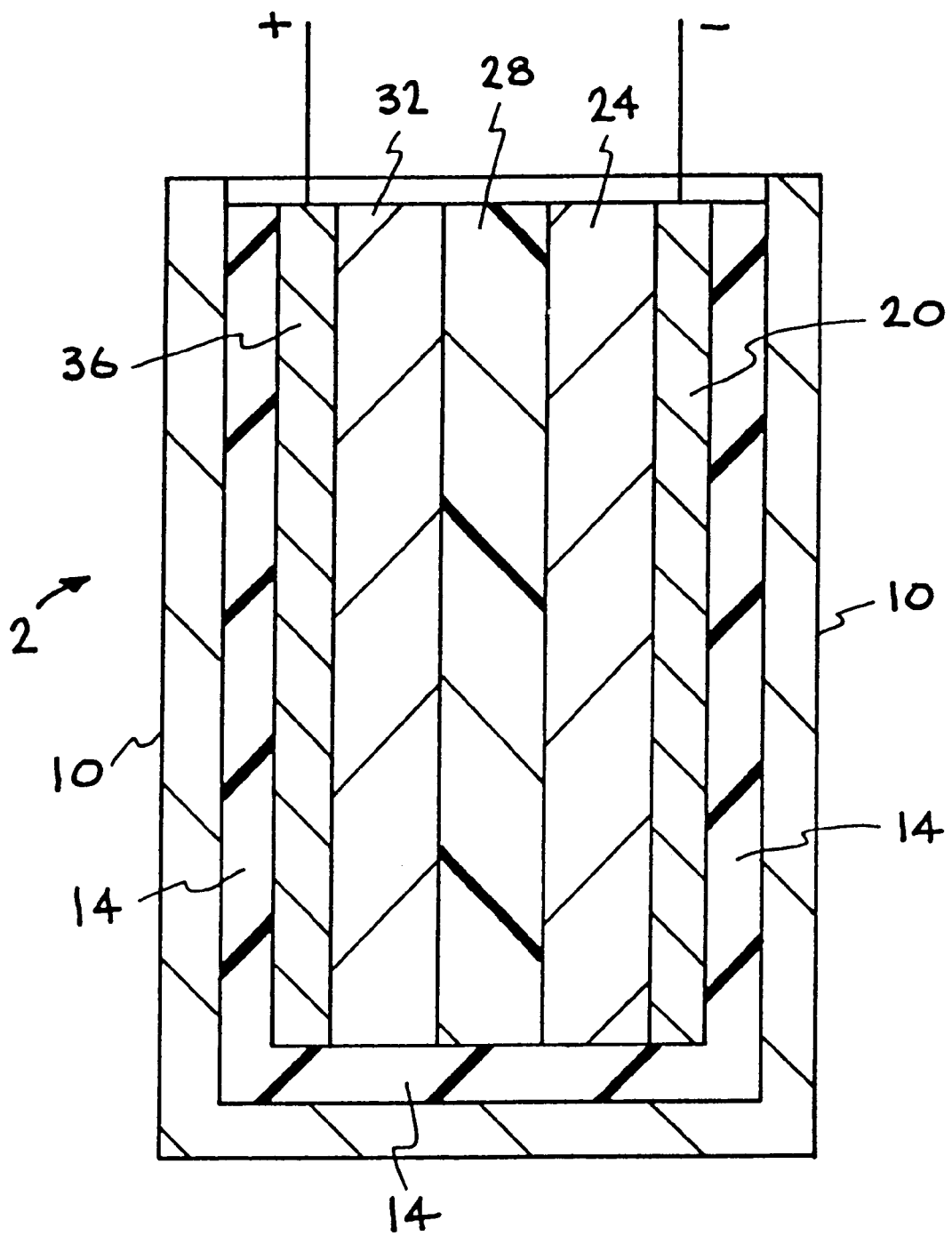

ELECTROCHEMICAL STORAGE CELL CONTAINING A SUBSTITUTED ANISOLE OR DI-ANISOLE REDOX SHUTTLE ADDITIVE FOR OVERCHARGE PROTECTION AND SUITABLE FOR USE IN LIQUID ORGANIC AND SOLID POLYMER ELECTROLYTES

The United States has rights in this invention pursuant to Contract No. DE-AC0-76SF00098 between the United States Department of Energy and the University of California for the operation of the Ernest Orlando Lawrence Berkeley National Laboratory.

BACKGROUND OF THE INVENTION

This invention relates to organic electrolyte electrochemical storage cells. Particularly, this invention relates to redox shuttle additives for both liquid organic and solid polymer electrolyte electrochemical storage cells to provide overcharge protection to the cell.

Electrochemical storage batteries of all types are susceptible to damage due to overcharging or over discharging. Overcharging of an electrochemical storage cell in a battery may be defined as charging beyond a cell's capacity, or at a rate greater than the cell's ability to accept such charge. The damage to the cell which may occur from such overcharging may include oxidation of the electrolyte leading to the production of protons which may then intercalate into the cathode material resulting in reduced cell capacity.

Protection against overcharging of a single cell, or a battery comprising a small stack of series-connected cells, may be achieved through direct monitoring (potentiometric, galvanometric, thermal, etc.), control of charging rates, and state of charge. However, for a large (typically bipolar) stack of cells of the magnitude required, for example, in batteries for use in electric vehicles, these methods are impractical due to their complexity, weight requirements, and expense. Under utilization of capacity or addition of immobile electroactive chemicals to one or more of the electrodes may provide some protection (at a considerable cost), but such techniques are ineffective against significant deterioration of capacity of a single cell within a stack, which is generally cumulative, and which may lead to a short or an open circuit.

For cells utilizing aqueous liquid electrolytes, production of oxygen and hydrogen gas at the respective electrodes provides a reversible reaction which serves to protect against overcharging, provided that the cell is a vented cell, or at least that the evolution of hydrogen and oxygen during the overcharge does not exceed the rate at which the hydrogen and oxygen recombine to form water.

For organic liquid electrolytes, a "redox shuttle" has been proposed as an approach to solving the problem of overcharging. This approach employs an electrolyte additive which is inactive under normal conditions, but which oxidizes at the positive electrode (cathode) when the cell potential exceeds the desired voltage, i.e., when the cell is in an overcharge state. The oxidized form of the shuttle additive diffuses through the cell to the negative electrode (anode) where it is reduced to its original (unoxidized) state and then the reduced form of the redox shuttle species diffuses through the cell back to the positive electrode to continue the redox cycle. The net effect is an internal shunt which prevents damage to the cell by imposing a limit on cell potential. As an example of the use of such a redox shuttle in an electrochemical cell with a liquid electrolyte, the use of metallocenes, such as ferrocene, as additives to a liquid electrolyte for overcharge protection has been suggested by Golovin et al., in "Applications of Metallocenes in Rechargeable Lithium Batteries for Overcharge Protection", Journal of the Electrochemical Society, Vol. 139, No. 1 (1992), at pp. 5–10.

The difficulty with the use of such a shuttle species, however, is that the most desired reactions are those which are difficult to ensure with a lithium organic system, i.e., a lithium cell with a solid organic polymer electrolyte. Since lithium metal is extremely reactive with organic materials, it is desirable that the shuttle only react with the lithium when the shuttle is in an oxidized state. Reactivity of lithium with organic materials is discussed by Adalbert Maercker in "Ether Cleavage with Organo-Alkali-Metal Compounds", Angew. Chem. Int. Ed. Engl. 26 (1987) pp 972–989.

Furthermore, the redox shuttle species must also be mobile enough to carry enough current through the solid polymer electrolyte between the electrodes to protect the cell. This mobility or diffusion capability must be in both directions, i.e., both when the oxidized shuttle is migrating from the cathode to the anode, and when the reduced form of the shuttle is migrating from the anode to the cathode.

Since lithium reacts with all organic species, a kinetic barrier to this reaction must be introduced. Most of all, the shuttle cannot contain functional groups that are more reactive than the electrolyte itself.

The use of redox shuttles in high voltage cathode lithium cells (4.3 V vs. Li) is even more difficult as the product of the oxidation at the cathode is a very energetic species. The intermediate may dimerize, deprotonate, or cyclize. A worse possibility is that the oxidized shuttle may remove an electron from an electrolyte species (solvent or salt) thereby acting as a catalyst for degradation of the electrolyte, creating a situation possibly worse than no shuttle at all.

It would, therefore, be desirable to provide a redox shuttle which will avoid these problems and yet be useable as a high voltage (i.e., over 4 V) shuttle. It would be further desirable if the shuttle material would be capable of modification to permit operation at various voltages. In particular, it would be desirable if one could achieve the desired overcharge protection, even at high voltages, while guiding the reactivity of the resulting shuttle species in a way that can be reversed at the other electrode, and which results in the production of a less energetic species that diffuse (in either direction) back to the other electrode, thereby reducing the risk of unwanted side reactions.

SUMMARY OF THE INVENTION

The invention comprises a electrochemical cell having an anode, a cathode, an organic liquid or solid polymer electrolyte, and a redox shuttle additive to protect the cell against overcharging selected from the group consisting of (a) a substituted anisole having the general formula (in an uncharged state):

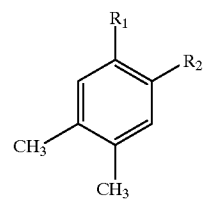

where $R_1$ is selected from the group consisting of H, $OCH_3$, $OCH_2CH_3$, and $OCH_2$phenyl, and $R_2$ is selected from the group consisting of $OCH_3$, $OCH_2CH_3$, $OCH_2$phenyl, and $O^-Li^+$; and (b) a di-anisole compound having the general formula (in an uncharged state):

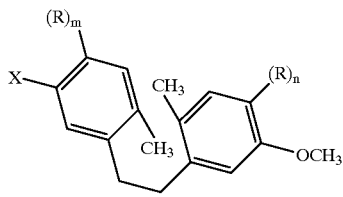

where R is selected from the group consisting of -OCH$_3$ and -CH$_3$, m is either 1 or 0, n is either 1 or 0, and X is selected from the group consisting of —OCH$_3$ (methoxy) or its lithium salt —O$^-$Li$^+$.

The lithium salt of the di-anisole is the preferred form of the redox shuttle additive because the shuttle anion will then initially have a single negative charge, it loses two electrons when it is oxidized at the cathode, and then moves toward the anode as a single positively charged species where it is then reduced to a single negatively charged species by gaining back two electrons, i.e., while the shuttle only moves back and forth between the anode and cathode as a single charged species, there is a two electron transfer at each electrode which increases the overall current carrying capacity of the shuttle molecule as it diffuses through the solid electrolyte in either direction. The value of m and n, in the above formula, will influence the onset voltage of the shuttle, with the lower value of 0 (less methyl or methoxy groups) providing a higher onset voltage of the redox shuttle additive of about 4.3 volts, whereas the presence of more methoxy or methyl groups on the rings will lower the onset voltage of the redox shuttle additive, e.g., when both m and n are at a value of 1, the onset voltage of the redox shuttle additive may be lowered down to approximately 4 volts versus lithium.

BRIEF DESCRIPTION OF THE DRAWINGS

The sole FIGURE is a vertical cross-sectional view of a solid polymer electrolyte electrochemical storage cell constructed in accordance with the invention with a redox shuttle additive of the invention in the cell.

DETAILED DESCRIPTION OF THE INVENTION

The invention comprises an organic liquid or solid polymer electrolyte electrochemical storage cell with a substituted anisole or di-anisole redox shuttle additive in the cell to prevent damage to the cell by overcharging.

The monomeric anisole derivative (substituted anisole) has the general formula (in the uncharged state):

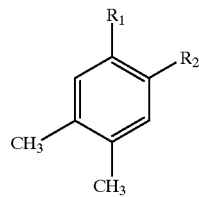

where R$_1$ is selected from the group consisting of H, OCH$_3$, OCH$_2$CH$_3$, and OCH$_2$phenyl, and R$_2$ is selected from the group consisting of OCH$_3$, OCH$_2$CH$_3$, OCH$_2$phenyl, and O$^-$Li$^+$.

The di-anisole redox shuttle additive of the invention has the general formula (in the uncharged state):

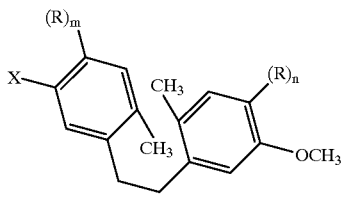

where R is selected from the group consisting of —OCH$_3$ and —CH$_3$, m is either 1 or 0, n is either 1 or 0, and X is selected from the group consisting of —OCH$_3$ (methoxy) or its lithium salt —O$^-$Li$^+$.

The substituted anisoles and di-anisole redox shuttle additives of the invention exhibit superior potential stability to lithium metal than other materials which have been previously proposed as organic redox shuttle materials. The reduction potentials of the substituted anisoles and di-anisole redox shuttle additives of the invention are much more negative than the redox shuttle additives proposed in the prior art such as ferrocenes and cyano benzenes.

While the electrochemical cell of the invention utilizing the redox shuttle additive of the invention may be either a primary or a secondary cell, and the anode and cathode material may, respectively, comprise a number of conventional anode or cathode materials, the redox additives to be described herein find utility in both liquid organic and solid polymer electrolytes and the di-anisoles find particularly utility in solid polymer electrolyte rechargeable (secondary) lithium cells, i.e., a rechargeable solid polymer electrolyte electrochemical cell wherein the anode is lithium and/or a lithium compound, and the salt or salts used in the solid electrolyte are lithium salts.

a. The Cell

The solid polymer electrolyte electrochemical cell of the invention having the di-anisole redox shuttle additive of the invention therein may, therefore, be referred to herein as a rechargeable lithium cell, by way of example, and not of limitation, it being understood that the redox shuttle additives to be described herein may have application to other solid polymer electrolyte electrochemical storage cells as well as lithium cells, and also in cells containing an organic liquid electrolyte.

Turning now to the FIGURE, an electrochemical storage cell having a solid polymer electrolyte is generally shown at 2 comprising a non-reactive outer shell or container 10 containing the active materials of the cell. Container 10 may comprise any conventional electrochemical storage cell case, such as a durable plastic or hard rubber material or a non-reactive metal such as stainless steel. Particularly when a metal is used in the formation of container 10, an optional insulating lining 14 may also be provided.

Adjacent one sidewall of container 10 is anode current collector 20, which may comprise a nonreactive metal sheet or mesh, e.g., a nickel, copper, or stainless steel material. Anode collector 20 may (as shown) be mounted next to, and in contact with, anode 24, which comprises the active anode material. Alternatively, by providing a mesh current collector into which is pressed the active anode material, anode collector 20 and anode 24 may comprise a unitary structure, hereinafter referred to as anode 24. It should be further noted that all of the components in the solid electrolyte electrochemical cell of the invention to be described herein should be capable of withstanding temperatures of at least 85° C. and up to as high as 120° C.

b. The anode

The active anode material in anode 24 may comprise metallic lithium or a lithium-containing material such as a lithiated carbon. Lithium-containing anode materials may be preferable over the use of metallic lithium because of the reactivity of lithium, and the possible adverse effects of such metallic lithium reactivity on the d-anisole redox shuttle additive which will be added to the solid electrolyte. However, for purposes of illustration, and not of limitation, anode 24 will, at times herein, also be referred to as a lithium electrode.

c. The Solid Polymer Electrolyte/Separator

Juxtaposed between anode 24 and a cathode 32, which will be described below, is solid polymer electrolyte 28 which, while being ionically conducting, also serves as an electronic insulator or separator between anode 24 and cathode 32. Solid polymer electrolyte 28 comprises a mixture of a solid organic polymer, which provides the electronic insulation properties of the solid polymer electrolyte; and a stable conductive lithium salt, which provides the ionic conduction properties of the solid polymer electrolyte. The mixture, together with any other optional additives such as plasticizers, dispersants, or the like, may be mounted on a non-metallic support such as a polytetrafluoroethylene (PTFE) plate or on a non-reactive metal mesh, e.g., a stainless steel mesh, if the polymer requires such support.

The solid organic separator material in solid polymer electrolyte 28 may, by way of example, comprise a polyether such as polyethylene oxide (PEO), polypropylene oxide (PPO), copolymers of the above polymers, and amorphous polyethylene oxide such as oxymethylene-linked polyethylene oxide. The solid organic separator material such as those mentioned above may be used in pure form or mixed with minor amounts of other additives such as, for example, a propylene carbonate liquid solvent.

The stable conductive lithium salt in the solid polymer electrolyte/separator may comprise any lithium salt conventionally used in the formation of solid polymer electrolytes which will not react with the di-anisole redox shuttle material such as, by way of example, lithium trifluoromethane sulfonate (lithium triflate) or lithium trifluoromethanesulfonimide (LiTFSI). Thus, the conductive lithium salt must be stable at the high operating temperatures (e.g., 85° C. to about 120° C.) normally encountered in the operation of a solid polymer electrolyte electrochemical storage cell.

The solid polymer electrolyte may be prepared by mixing the solid polymer and conductive lithium salt with a liquid such as acetonitrile or any other suitable liquid such as propylene carbonate, or mixed solvents such as ethylene carbonate/dimethyl carbonate to form a paste which may then be applied to a tetrafluoroethylene plate or a stainless steel mesh such as used in forming the current collectors for the anode and cathode.

The ratio of polymer material to lithium salt in the solid polymer electrolyte, for example when the polymer is a polyether, ranges from 12 to 20 monomer units of the polymer per equivalent of lithium salt, e.g., $P(RO)_{12}LiX$ to $P(RO)_{20}LiX$ where RO is one monomeric unit of a polyether such as polyethylene oxide or polypropylene oxide, and X is the anion of the lithium salt. An optimum ratio of polymer separator to lithium salt, when the polymer is a polyether such as polyethylene oxide or polypropylene oxide, and the lithium salt is lithium trifluoromethane sulfonimide (LiTFSI), is about sixteen monomer units of the polymer per equivalent of lithium salt, e.g., $P(RO)_{16}LiTFSI$. That is, wherein sixteen ethylene oxide monomeric units per equivalent of LiTFSI lithium salt would be denoted as $P(EO)_{16}LiTFSI$, and sixteen propylene oxide monomeric units per equivalent of LiTFSI lithium salt would be denoted as $P(PO)_{16}LiTFSI$. For other solid electrolytes, i.e., for solid electrolytes utilizing other polymers, the polymer concentration may range from about 5 to about 80 per mole of lithium salt in the solid electrolyte.

d. The Cathode

Next to solid polymer electrolyte/separator 28 is cathode 32 which, in turn, is shown mounted next to, and in contact with, a metal cathode current collector 36. As in the case of anode 24, cathode 32 and cathode current collector 36 may be consolidated into a single structure by constructing the metal current collector as a metal mesh and then incorporating the active cathode material into the current collector. In the described preferred embodiment, the active cathode material may comprise any conventional oxidizable lithium salt normally used in rechargeable lithium electrochemical storage cells such as a lithium manganese oxide salt, e.g., $Li_{2+x}Mn_4O_9$, where x is greater than 0 and less than 3. The active cathode material may also contain other optional additives such as, for example, carbon to increase the conductivity, or a dispersant to prevent clumping of insoluble materials in the composite cathode. The amount of optional conductive additive such as carbon added to the cathode mixture may range from 0 to 25 wt. % of the entire cathode mixture, and preferably will range from about 5 wt. % to about 15 wt. %, and typically will be about 10 wt. %. The amount of optional dispersant added to the composite cathode mixture will range from 0 to about 7 wt. %, and preferably from about 2 wt. % to about 5 wt. %. Any typical dispersant, such as a polyoxyethylene derivative, e.g., Brij-35, or a non-ionic detergent such as Triton X-100, may be used.

e. The Redox Shuttle Additive

In accordance with the invention, the redox shuttle additive of the invention for use with the organic liquid or solid polymer electrolyte cell of the invention comprises either a substituted anisole or a di-anisole compound. The substituted anisole redox shuttle additive has the general formula (in an uncharged state):

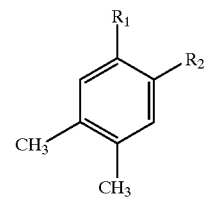

where $R_1$ is selected from the group consisting of H, $OCH_3$, $OCH_2CH_3$, and $OCH_2phenyl$, and $R_2$ is selected from the group consisting of $OCH_3$, $OCH_2CH_3$, $OCH_2phenyl$, and $O^-Li^+$.

The uncharged substituted anisole shown in (I) above, first charges into the state shown in (II) below:

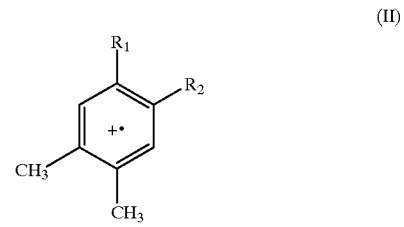

where $R_1$ is selected from the group consisting of H, $OCH_3$, $OCH_2CH_3$, and $OCH_2phenyl$, and $R_2$ is selected from the group consisting of $OCH_3$, $OCH_2CH_3$, $OCH_2phenyl$, and $O^-Li^+$.

Two of the resultant charged radicals then dimerize to form the more stable (less reactive) structure shown in (III) below, with the more reactive free radicals now gone, i.e., the charged dimer removes the unpaired spin of the radical (the unpaired electrons of the radicals). This effect will also be discussed in more detail below with respect to the di-anisole redox shuttle.

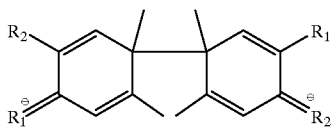
(III)

The di-anisole redox shuttle additive of the invention has the general formula (in an uncharged state):

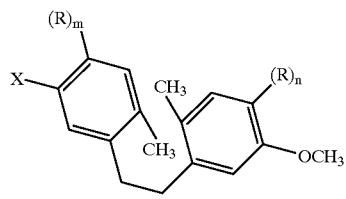

where R is selected from the group consisting of —OCH$_3$ and CH$_3$, m is either 1 or 0, n is either 1 or 0, and X is selected from the group consisting of —OCH$_3$ (methoxy) or its lithium salt —O$^-$Li$^+$.

The value of m and n in the di-anisole redox shuttle will influence the onset voltage of the shuttle, with the lower value of 0 (less methyl or methoxy groups) providing a higher onset voltage of the redox shuttle additive of about 4.3 volts, whereas the presence of more methoxy or methyl groups on the rings will lower the onset voltage of the redox shuttle additive, e.g., when both m and n are at a value of 1, the onset voltage of the redox shuttle additive may be lowered down to approximately 4.0 volts. For use in a lithium cell, the preferred value of both m and n is 0 in the redox shuttle additive, to thereby provide the maximum onset voltage possible with this shuttle material, i.e. 4.1 volts.

In the preferred embodiment, X comprises the lithium salt form of the di-anisole redox shuttle additive, because the resulting shuttle anion (cation) will then transport between the electrode with either a single negative charge or a single positive charge, yet provide a two electron transfer when it is either oxidized or reduced. That is, the redox shuttle species will lose two electrons when it is oxidized at the cathode, thereby becoming a single positively charged species. Then after it diffuses back to the anode as a single positively charged species, it will be reduced at the anode to a single negatively charged species by gaining back two electrons. The single negatively charged redox shuttle species then diffuses back to the cathode to again lose two electrons during oxidation.

Thus, while the shuttle only moves back and forth between the anode and cathode as a single charged species, there is a two electron transfer at each electrode which increases the overall current carrying capacity of the shuttle ion in each direction. Furthermore, the negative charge of the resulting anion will make the di-anisole molecule more resistant to further reduction by the lithium anode. The use of the di-anisole molecule in its salt form also avoids volatility issues. The charge also may help avoid some of the problems associated with concentration polarization due to migration effects.

One of the advantages of the two ring anisole structure as a redox shuttle additive is that the problem of free radical generation and activity is addressed by such a structure. In the charging or discharging of organic materials by the breaking of bonds in an electrochemical cell, free radicals are also generated which, in turn, create an undesirable reactivity in the cell wherein, for example, the free radical may irreversibly bond to another constituent in the cell. The two ring anisole structure of the invention addresses this problem by the generation of two free radicals during the positive charging of the molecule at the cathode, one associated with each ring of the two ring structure, which then reversibly bond together.

This is illustrated by the black dots shown in structure (V) below (which shows the preferred species of the di-anisole structure, wherein both m and n are 0, i.e., the high onset voltage species). Each of the two black dots in the molecule represents one of the two free radicals generated in the structure by the loss of the two electrons by oxidation of the species at the cathode. In accordance with an aspect of this invention, in this structure the two free radicals reversibly bond the two ring structures together as shown at arrow A in structure (VI) below, without, however, changing the positively charged state of the molecule. Subsequently, after diffusion of the positively charged structure back to the anode where it is reduced (i.e., regains the two lost electrons), the bond shown at arrow A in structure (VI) opens up again, as shown in structure (VII). Thus, the free radical generation by the redox shuttle species of the invention, during oxidation of the species at the cathode, does not result in an increased and undesirable reactivity of the redox shuttle additive with other materials in the electrochemical cell. Rather, the dual generation of free radicals in the shuttle molecule results in the reversible (and therefore harmless) further bonding of the two rings together, as shown in structure (VI).

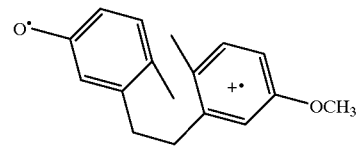
(V)

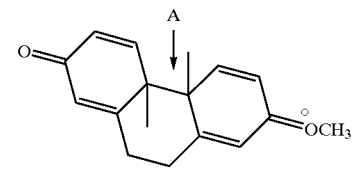
(VI)

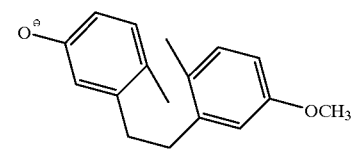
(VII)

f. Formation of the Redox Shuttle Molecule

As an example of the substituted anisole redox shuttle molecule of the invention, the substituted anisole 4,5-dimethylveratrole (dimethoxybenzene) is prepared according to the method of Falck et al., Journal of the American Chemical Society, 96 (1974), 2981. 1.8 g of 6-methylveratraldehyde (1,2-dimethoxy,6-methylbenzaldehyde) is treated with 2 g of KOH, 1.4 ml of 95% hydrazine, and 20 ml of diethylene glycol at reflux temperature until the KOH disappears. After 3 further hours of heating, the solution is cooled and poured into cold water (1.5 liters) and extracted into ether. Combined extracts are washed with water, dried, and evaporated to yield a quantitative amount of 4,5-dimethylvaratrole as a cream colored solid. The material may be purified by sublimation at 60° C. and 0.05 mm to give a white powder, m.p. 41–42° C. When the lithium salt is to be formed, a phenylmethoxy group is used and the phenyl group is cleaved off, as is known to those skilled in the art, to form the lithium salt.

The di-anisole redox shuttle of the invention may be formed by a modified Wolf-Kischner reaction described in Falck et al. and shown in the scheme below. The starting aldehydes and phenylacetic acids are generally available from sources such as the Aldrich Chemical Company. The selection of the substituents determines the ultimate structure of the shuttle. When an O—CH$_2$-benzene group is used, it can be cleaved by acid hydrolysis or reduction to yield a phenol group from which the lithium phenoxide salt may be prepared. The general synthesis scheme is exemplified as follows: To a stirring solution of 35.6 g (0.24 mole) of 3,4-dimethoxytoluene and 14.6 g (0.1 mole) of AlCl$_3$ in 200 ml of CS$_2$ is added dropwise over the course of one hour, 0.1 mole of 3,4-dimethoxyphenylacetylchloride, freshly prepared from the commercially available 3,4-dimethoxy phenylacetic acid. The mixture is stirred overnight at 25° C. and then poured into ice and the resulting oil is extracted into benzene. The extracts are dried and evaporated to yield a black, viscous oil from which the excess dimethoxytoluene is distilled in vacuo. After the pot residue is cooled, alcohol is added and the mixture allowed to stand for 24 hours at 0° C. Essentially pure ketone can be isolated as a brown powder. 8 g of this isolated material is reacted with 10 g of KOH in a solution of 6.5 ml of 95 % hydrazine in 84 ml of triethylene glycol in the same manner as described above for the preparation of 3,4-dimethylveratrole. This procedure yields a yellow oil which can be crystallized from alcohol.

When a lithium phenoxide salt, for example, is desired, the substituents are chosen so that an —OBz group is on one of the rings. The material is dissolved in trifluoroacetic acid and allowed to stand for 24 hours. After evaporation of the acid, the residue is dissolved in 0.2 M NaOH solution and extracted with ethyl acetate. The solution is acidified to pH –9 and buffered by the addition of solid K$_2$HPO$_4$. Extraction with a mixture of isopropanol and 1,2-dichloroethane gives a yellow oil upon drying and evaporation. The material may be purified by chromatography using Sephadex LH20 and ethyl acetate followed by recrystallization from acetone. The lithium salt may be prepared by dissolution of the phenol in a solution of acetonitrile to which an appropriate amount of lithium hydride has been added. After stirring the solvent may be removed by evaporation. It is always advisable to add a slight excess of the phenol in order to avoid products from the solvent acetonitrile. It will be obvious to those skilled in the art that the final substitution pattern on the shuttle will be determined by the choice of the starting material, with such starting materials either available commercially or by standard modifications of available materials.

g. Incorporation of the Redox Shuttle Additive into the Cell

The di-anisole redox shuttle additive of the invention may, initially, be incorporated into either the above-described electrolyte mixture or it may be added to the cathode mixture. To facilitate mixing the redox shuttle additive with the other constituents of the solid electrolyte or cathode, the di-anisole may be mixed with a solvent such as acetonitrile, glyme, or glutaronitrile, in a concentration ranging from about 0.1 wt. % to about 1 wt. % of the total weight of the di-anisole redox shuttle additive/solvent.

The di-anisole redox shuttle additive should be added to the cell in an amount ranging from about 0.01 wt. % to about 5 wt. % of the entire weight (including the redox shuttle additive) of the solid polymer electrolyte. An amount less than the minimum amount recited above will be insufficient to provide the necessary current for the desired overcharge protection, while an amount in excess of the recited maximum amount may interfere with proper operation of the electrochemical cell.

Thus the invention provides an improved solid or liquid electrolyte electrochemical cell, such as a rechargeable lithium cell, wherein a substituted anisole or di-anisole redox shuttle additive provides protection for the cell against overcharging in a manner in which reactivity of the shuttle additive with other constituents of the cell are minimized and diffusion through the electrolyte is particularly enhanced by providing for a two electron gain or loss by the di-anisole redox shuttle ion at the respective electrodes.

While specific embodiments of the electrochemical cell and redox shuttle additive of the invention has been illustrated and described for carrying out the practice of the invention, modifications and changes of the apparatus, parameters, materials, etc. will become apparent to those skilled in the art, and it is intended to cover in the appended claims all such modifications and changes which come within the scope of the invention.

What is claimed is:

1. An electrochemical cell having an anode, a cathode, an electrolyte, and a redox shuttle additive to protect the cell against overcharging selected from the group consisting of selected from the group consisting of:

(a) a substituted anisole having the general formula (in an uncharged state):

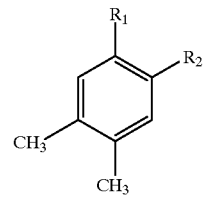

where R$_1$ is selected from the group consisting of H, OCH$_3$, OCH$_2$CH$_3$, and OCH$_2$phenyl, and R$_2$ is selected from the group consisting of OCH$_3$, OCH$_2$CH$_3$, OCH$_2$phenyl, and O$^-$Li$^+$; and (b) a di-anisole compound having the general formula (in an uncharged state):

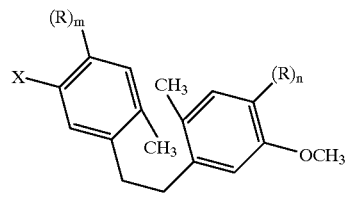

where R is selected from the group consisting of –OCH$_3$ and –CH$_3$, m is either 1 or 0, n is either 1 or 0, and X is selected from the group consisting of –OCH$_3$ (methoxy) or its lithium salt —O$^-$Li$^+$.

2. The electrochemical cell of claim 1 wherein said electrolyte comprises a solid polymer electrolyte.

3. The electrochemical cell of claim 2 wherein said redox shuttle additive comprises said substituted anisole having the general formula (in an uncharged state):

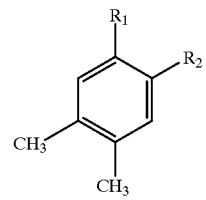

where R$_1$ is selected from the group consisting of H, OCH$_3$, OCH$_2$CH$_3$, and OCH$_2$phenyl, and R$_2$ is selected from the group consisting of OCH$_3$, OCH$_2$CH$_3$, OCH$_2$phenyl, and O$^-$Li$^+$.

4. The electrochemical cell of claim 2 wherein said redox shuttle additive comprises said di-anisole compound having the general formula (in an uncharged state):

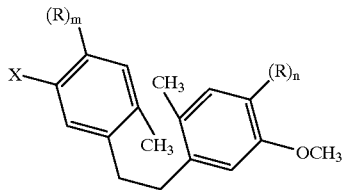

where R is selected from the group consisting of —OCH₃ and —CH₃, m is either 1 or 0, n is either 1 or 0, and X is selected from the group consisting of —OCH₃ (methoxy) or its lithium salt —O⁻Li⁺.

5. The electrochemical cell of claim 4 wherein X is —O⁻Li⁺.

6. The electrochemical cell of claim 5 wherein m and n are each 0.

7. The electrochemical cell of claim 6 wherein said di-anisole redox shuttle additive is further characterized by an onset voltage of about 4.1 volts.

8. The electrochemical cell of claim 6 wherein said anode contains lithium.

9. The electrochemical cell of claim 6 wherein said solid polymer electrolyte includes a lithium salt.

10. The electrochemical cell of claim 6 wherein said solid polymer electrolyte also contains an organic polymer.

11. The electrochemical cell of claim 10 wherein said polymer in said solid electrolyte comprises a polyether.

12. The electrochemical cell of claim 6 wherein said cathode includes a lithium salt.

13. The electrochemical cell of claim 6 wherein said anode, said cathode, said solid polymer electrolyte, and said di-anisole redox shuttle additive which protects said cell against overcharging are each capable of functioning in said cell at an elevated temperature of at least about 85° C.

14. The electrochemical cell of claim 4 wherein the concentration of said di-anisole redox shuttle additive in said cell is sufficient to permit said di-anisole redox shuttle additive to carry all of the charging current when said cell is being overcharged.

15. The electrochemical cell of claim 4 wherein m and n are each 1.

16. The electrochemical cell of claim 4 wherein m is 1 and n is 0.

17. The electrochemical cell of claim 4 wherein m is 0 and n is 1.

18. The electrochemical cell of claim 1 wherein said electrolyte comprises a liquid organic electrolyte.

19. An electrochemical cell having an anode, a cathode, a solid polymer electrolyte, and a redox shuttle additive to protect the cell against overcharging comprising a lithium salt of a di-anisole compound having the general formula:

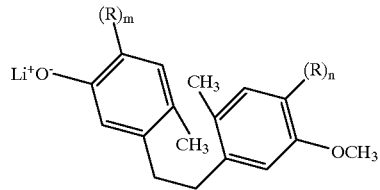

where R is selected from the group consisting of –OCH₃ and –CH₃, m is either 1 or 0, and n is either 1 or 0.

20. The electrochemical cell of claim 19 wherein m and n are each 0, and said di-anisole redox shuttle additive is further characterized by an onset voltage of about 4.1 volts.

21. The electrochemical cell of claim 20 wherein said anode contains lithium.

22. The electrochemical cell of claim 20 wherein said solid polymer electrolyte includes a lithium salt.

23. The electrochemical cell of claim 20 wherein said cathode includes a lithium salt.

24. A rechargeable lithium electrochemical cell having a anode containing lithium, a cathode which includes a lithium salt, a solid polymer electrolyte which includes a lithium salt, and a redox shuttle additive to protect the cell against overcharging comprising a lithium salt of a di-anisole compound having the formula:

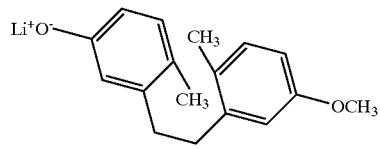

wherein said redox shuttle additive comprising said lithium salt of said di-anisole will protect said cell form overcharging beyond a voltage of about 4.1 volts.

* * * * *